United States Patent
Tesanovic et al.

(10) Patent No.: US 11,564,124 B2
(45) Date of Patent: Jan. 24, 2023

(54) METHOD AND APPARATUS FOR REDUCING SCHEDULING LATENCY IN A WIRELESS COMMUNICATION SYSTEM

(71) Applicant: Samsung Electronics Co., Ltd., Suwon-si (KR)

(72) Inventors: Milos Tesanovic, Middlesex (GB); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/791,987

(22) Filed: Feb. 14, 2020

(65) Prior Publication Data
US 2020/0267595 A1  Aug. 20, 2020

(30) Foreign Application Priority Data
Feb. 14, 2019 (GB) ..................................... 1902041

(51) Int. Cl.
*H04W 28/02* (2009.01)
*H04W 72/12* (2009.01)
*H04W 72/14* (2009.01)

(52) U.S. Cl.
CPC ... *H04W 28/0278* (2013.01); *H04W 72/1242* (2013.01); *H04W 72/1263* (2013.01); *H04W 72/14* (2013.01)

(58) Field of Classification Search
None
See application file for complete search history.

(56) References Cited

U.S. PATENT DOCUMENTS

| 2018/0092139 A1 | 3/2018 | Nowlan et al. |
| 2019/0045534 A1 | 2/2019 | Zaks et al. |
| 2019/0053260 A1* | 2/2019 | Shaheen ............ H04W 72/1242 |
| 2020/0205029 A1* | 6/2020 | Lee ................... H04W 28/0278 |

(Continued)

FOREIGN PATENT DOCUMENTS

| EP | 3570617 A1 | 11/2019 |
| WO | 2017134578 A1 | 8/2017 |

(Continued)

OTHER PUBLICATIONS

3GPP, Ericsson, TSG-RAN WG2 Meeting #103b, Uplink Scheduling in IAG Networks, R2-1814365, p. 1-6 (Year: 2018).*

(Continued)

*Primary Examiner* — Kouroush Mohebbi (57) ABSTRACT

A second network node in a wireless communication system includes a transceiver and at least one processor configured to control the transceiver to receive, from a first network node, at least one of a first scheduling request (SR) or a first buffer status report (BSR); control the transceiver to transmit, to a third network node, at least one of a second SR or a second BSR based on the first SR or the first BSR before receiving data to be transmitted corresponding to the first SR or the first BSR from the first network node; control the transceiver to receive, from the third network node, a first uplink (UL) grant corresponding to the second SR or the second BSR; control the transceiver to receive the data from the first network node; and control the transceiver to transmit the data to the third network node.

16 Claims, 5 Drawing Sheets

(56) References Cited

U.S. PATENT DOCUMENTS

2020/0245186 A1\* 7/2020 Chen ................. H04W 88/10

FOREIGN PATENT DOCUMENTS

WO 2018202120 A1 11/2018
WO 2020065446 A1 4/2020

OTHER PUBLICATIONS

Qualcomm, "CR to 38.300 on Integrated Access and Backhaul for NR", 3GPP TSG-RAN WG2 Meeting #105bis, Apr. 8-12, 2018, R2-1905476, 8 pages.
International Search Report and Written Opinion of the International Searching Authority in connection with International Application No. PCT/KR2020/001754 dated May 19, 2020, 9 pages.
Ericsson, "Uplink Scheduling in IAB Networks," R2-1814365, 3GPP TSG-RAN WG2 Meeting #103b, Chengdu, P.R. China, Oct. 8-12, 2018, 6 pages.
Ericsson, "Scheduling in IAB Networks," R2-1816575, 3GPP TSG-RAN WG2#104, Spokane, USA, Nov. 12-16, 2018, 3 pages.
LG Electronics Inc., "Discussion on BSR cancellation by the Truncated BSR," R2-1812798, 3GPP TSG-RAN WG2 Meeting #103, Gothenburg, Sweden, Aug. 20-24, 2018, 2 pages.
Intel Corporation, "Uplink Latency in IAB networks," R2-1817700, 3GPP TSG RAN WG2 Meeting #104, Spokane, U.S.A., Nov. 12-16, 2018, 4 pages.
"Examination Report under Section 18(3)" dated Jun. 16, 2021, in connection with GB Patent Application No. 1902041.1, 4 pages.
European Patent Office, "Supplementary European Search Report" dated Feb. 24, 2022, in connection with European Patent Application No. 20755458.5, 12 pages.
Huawei et al: "Pre-BSR Enabling Fast Scheduling" 3GPP TSG-RAN WG2 Meeting 103bis, R2-1815504 (Revision of R2-1812881), Chengdu, China, Oct. 8-12, 2018, 3 pages.
LG Electronics Inc: "Scheduling enhancement in IAB" 3GPP TSG-RAN WG2 Meeting #103, R2-1812638, Gothenburg, Sweden, Aug. 20-24, 2018, 2 pages.

\* cited by examiner

METHOD AND APPARATUS FOR REDUCING SCHEDULING LATENCY IN A WIRELESS COMMUNICATION SYSTEM

CROSS-REFERENCE TO RELATED APPLICATION

This application is based on and claims priority under 35 U.S.C. § 119 to United Kingdom Patent Application No. 1902041.1 filed on Feb. 14, 2019 in the United Kingdom Intellectual Property Office, the disclosure of which is incorporated by reference herein in its entirety.

BACKGROUND

1. Field

The present disclosure relates to the reduction of scheduling latency in a telecommunication system. In particular, it relates to a problem with latency in a system implementing Integrated Access and Backhaul (IAB). This is known and used in at least Fifth Generation (5G) or New Radio (NR) systems.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required. For example, methods for reducing latency in a system implementing Integrated Access and Backhaul (IAB) are required.

SUMMARY

A second network node in a wireless communication system is provided. The second network node comprises: a transceiver; and at least one processor configured to: receive, from a first network node, at least one of a first scheduling request (SR) or a first buffer status report (BSR); transmit, to a third network node, at least one of a second SR or a second BSR based on the first SR or the first BSR before receiving data to be transmitted corresponding to the first SR or the first BSR from the first network node; receive, from the third network node, a first uplink (UL) grant corresponding to the second SR or the second BSR; receive the data from the first network node; and transmit the data to the third network node.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

DETAILED DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In one embodiment, a method performed by a second network node in a wireless communication system is provided. The method comprises: receiving, from a first network node, at least one of a first scheduling request (SR) or a first buffer status report (BSR); transmitting, to a third network node, at least one of a second SR or a second BSR based on the first SR or the first BSR before receiving data to be transmitted corresponding to the first SR or the first BSR from the first network node; receiving, from the third network node, a first uplink (UL) grant corresponding to the second SR or the second BSR; receiving the data from the first network node; and transmitting the data to the third network node.

In an embodiment, the method further comprises: transmitting, to the first network node, a second UL grant corresponding to the first SR or the first BSR, wherein the transmitting, to the third network node, the at least one of the second SR or the second BSR comprises: transmitting the at least one of the second SR or the second BSR based on the second UL grant.

In an embodiment, the transmitting, to the third network node, the second BSR comprises: determining whether to transmit the second BSR based on the at least one of SR configuration of the first SR or the first BSR; and transmitting the second BSR based on the determination result.

In an embodiment, the determining whether to transmit the second BSR comprises: determining whether to transmit the second BSR based on a priority of the data to be transmitted.

In an embodiment, the determining whether to transmit the second BSR based on the priority of the data to be transmitted comprises: determining to transmit the second BSR in case that the priority of the data to be transmitted is higher than a priority of data present in a buffer of the second network node.

In an embodiment, the determining whether to transmit the second BSR comprises: determining whether to transmit the second BSR based on a number of hops required for the data to reach destination of the data.

In an embodiment, the second BSR includes buffer status information of the second network node corresponding to the data to be transmitted.

In an embodiment, the second BSR is assigned a logical channel identifier (LCID) different from another LCID assigned to another BSR, and the other BSR includes buffer status information of the second network node corresponding to data currently present in the buffer.

In one embodiment, a second network node in a wireless communication system is provided. The second network node comprises: a transceiver; and at least one processor configured to: receive, from a first network node, at least one of a first scheduling request (SR) or a first buffer status report (BSR); transmit, to a third network node, at least one of a second SR or a second BSR based on the first SR or the first BSR before receiving data to be transmitted corresponding to the first SR or the first BSR from the first network node; receive, from the third network node, a first uplink (UL) grant corresponding to the second SR or the second BSR; receive the data from the first network node; and transmit the data to the third network node.

In an embodiment, the at least one processor is further configured to:
transmit, to the first network node, a second UL grant corresponding to the first SR or the first BSR, and
transmit, to the third network node, the at least one of the second SR or the second BSR based on the second UL grant.

In an embodiment, the at least one processor is further configured to: determine whether to transmit the second BSR based on the at least one of SR configuration of the first SR or the first BSR; and transmit, to the third network node, the second BSR based on the determination result.

In an embodiment, the at least one processor is further configured to: determine whether to transmit the second BSR based on a priority of the data to be transmitted.

In an embodiment, the at least one processor is further configured to: determine to transmit the second BSR in case that the priority of the data to be transmitted is higher than a priority of data present in a buffer of the second network node.

In an embodiment, the at least one processor is further configured to: determine whether to transmit the second BSR based on a number of hops required for the data to reach destination of the data.

In an embodiment, the second BSR includes buffer status information of the second network node corresponding to the data to be transmitted.

In an embodiment, the second BSR is assigned a logical channel identifier (LCID) different from another LCID assigned to another BSR, and the other BSR includes buffer status information of the second network node corresponding to data currently present in the buffer.

In one embodiment, there is provided a method of requesting resources from a node in a multi-node telecommunication system, wherein a first node transmits data to a second node and the second node transmits the data to a third node, comprising the steps of: the first node indicating to the second node that it has data intended for the second node; the second node, in response, determining whether to request resources from the third node; and the third node providing resources to the second node based, in part, on the request from the second node; and the second node transmitting the data received from the first node to the third node.

In an embodiment, the step of the first node indicating to the second node that it has data intended for the second node comprises the first node transmitting either a Scheduling Request, SR, message or a Buffer Status Report, BSR, message.

In an embodiment, the step of the second node, in response, requesting resources from the third node occurs before the second node receives the data transmitted from the first node.

In an embodiment, the step of the second node, in response, requesting resources from the third node further comprises the step of only requesting resources if one or more additional criteria are met.

In an embodiment, the one or more additional criteria includes information from the first node indicating:
the presence of data in the first node of a specific type or pertaining to a specific service; or
the presence of data of high priority; or
the presence of data of a certain priority relative to priority of existing data in the node's own buffers; or
the total buffer occupancy at the first node is above a certain threshold; or
that the amount of data of a specific type or pertaining to a specific service or of high priority, is above a certain threshold; or
the presence of data which will require a certain number of hops above a defined threshold to reach its destination; or
the presence of data, the transmission of which will require a type of resource which is not already configured.

In an embodiment, the information from the first node is included in a Buffer Status Report, BSR.

In an embodiment, the one or more additional criteria includes the second node determining that its time to grant for the first node and/or the time until resources referenced in the grant are available is above a defined threshold.

In an embodiment, the one or more additional criteria includes the second node determining that it cannot provide resources to the first node within a defined period.

In an embodiment, the one or more additional criteria includes the use by the first node of a particular configuration on which to send the resource request, which indicates that the resource request is originated at least in part by:
a logical channel of high priority; or
a logical channel of a certain priority relative to priority of existing data in the node's own buffers; or
a logical channel dedicated to a specific service or with data of high priority, is above a defined threshold; or
a logical channel with data which will require a defined number of hops above a defined threshold to reach its destination; or
a logical channel with data which will require a type of resource which is not already configured.

In an embodiment, the information from the first node is included in a Scheduling Request, SR.

In an embodiment, the step of the second node, in response, requesting resources from the third node comprises forwarding, to the third node, a buffer status of the first node.

In an embodiment, the step of the second node, in response, requesting resources from the third node comprises transmitting information to the third node relating to full or partial buffer status of the first node, converted to the status of the second node buffers.

In an embodiment, the full or partial buffer status of the first node, converted to the status of the second node buffers comprises matching priorities of logical channels and/or services provided by logical channels to obtain a cumulative value comprising actual buffer status of the second node and expected change of the buffer status of the second node.

In an embodiment, the information transmitted to the third node is either:
(a) indicative of an expected increase of the buffer status of the second node after data from the first node is received; or
(b) indicative of a combination with existing data in the second node buffers.

In an embodiment, in the case of option (a), the information comprises an indication that it relates to the expected increase.

In an embodiment, in the case of option (b), the information comprises an indication that it relates to the total amount of data.

In an embodiment, the information transmitted to the third node includes a deduction in expected buffer status occupancy based on UL resource already granted to the second node.

In an embodiment, the expected increase in buffer status or the combination with existing data in the second node buffers is included when resources allocated to the second node have padding, a size of which is equal to or larger than the size of expected buffer status or the combination with existing data in the second node buffers plus any associated subheader or control element.

In an embodiment, a padding size is smaller than the total size of actual buffer status and the expected increase or the combination with existing data in the second node buffers, whereby a determination, based on prioritization, is made as to which information is transmitted.

In an embodiment, the determination, based on prioritization, is made on the basis of how recently information on existing buffer status has been transmitted.

In one embodiment, there is provided an apparatus arranged to perform at least one method described above.

In one embodiment, there is provided at least one base station operable to perform the at least one method described above.

Although a few embodiments of the present disclosure have been shown and described, it will be appreciated by those skilled in the art that various changes and modifications might be made without departing from the scope of the disclosure, as defined in the appended claims.

For a better understanding of the disclosure, and to show how embodiments of the same may be carried into effect, reference will be made, by way of example only, to the accompanying diagrammatic drawings.

The following description with reference to accompanying drawings is provided to assist in a comprehensive understanding of various embodiments of the disclosure as defined by the claims and their equivalents. It includes various specific details to assist in that understanding but these are to be regarded as merely illustrative. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof. Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

Figure 1:
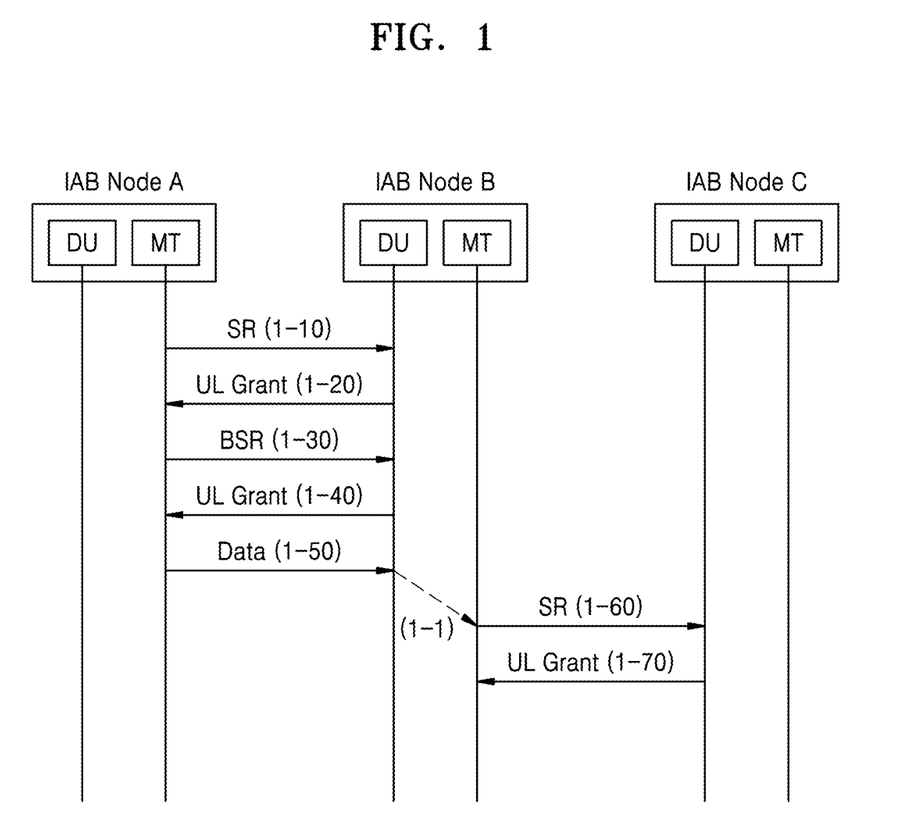
FIG. 1 illustrates a message exchange procedure involving three nodes in a multi-hop IAB network arrangement in a wireless communication system according to various embodiments of the present disclosure.

An IAB node features, at least conceptually, a base station part or Distributed Unit (DU) and a Mobile Telephone (MT) part. The MT part can currently only request uplink (UL) resources for the UL data transmission after it actually receives the data to be transmitted from its child node, despite already having knowledge of incoming data. In a multi-hop network, any such latency delays are likely to accumulate due to the number of hops and aggregated volume of data at IAB nodes. This is illustrated in FIG. 1, which shows the worst-case scenario where neither of the IAB nodes A or B have any UL resource currently allocated to them. In the present disclosure, a network node may be simply referred to as a node.

FIG. 1 illustrates a message exchange procedure involving three nodes in a multi-hop IAB network arrangement in a wireless communication system according to various embodiments of the present disclosure.

In FIG. 1, there is a typical telecommunication network shown, which uses several IAB nodes in a multi-hop configuration. Data is passed from Node A (first node) to Node B (second node) to Node C (third node) and onward. Various embodiments of the disclosure recognize that when Node A (the child) needs to transmit data to Node B (the parent), it transmits a message (1-10) comprising a Scheduling Request (SR). Node B responds with a UL grant message (1-20) allocating some capacity to Node A. Node A then transmits a Buffer Status Report (BSR) message (1-30). This indicates to Node B the quantity of data which it needs to transmit. Node B responds with a further UL grant message (1-40) allocating a suitable capacity to Node A to transmit its data, which it does in message 1-50.

If there is capacity already available for Node A to signal to Node B that a substantial amount of data needs transmitting, then steps 1-10 and 1-20 may be omitted and Node A may be able to transmit its BSR message (1-30) directly.

Once Node B receives the data at its DU, its MT sends a new scheduling request message (1-60) to Node C. Node C responds with a UL grant message (1-70) and the same pattern of steps as already set out (i.e. identical to 1-30 to 1-50) is repeated between Nodes B and C.

Importantly, in this arrangement, Node B is not able to request resources from Node C until it has received the data (1-50). This dependence is indicated by dashed arrow 1-1.

Various embodiments of the present disclosure provides methods to address issues such as those set out above.

Figure 2:
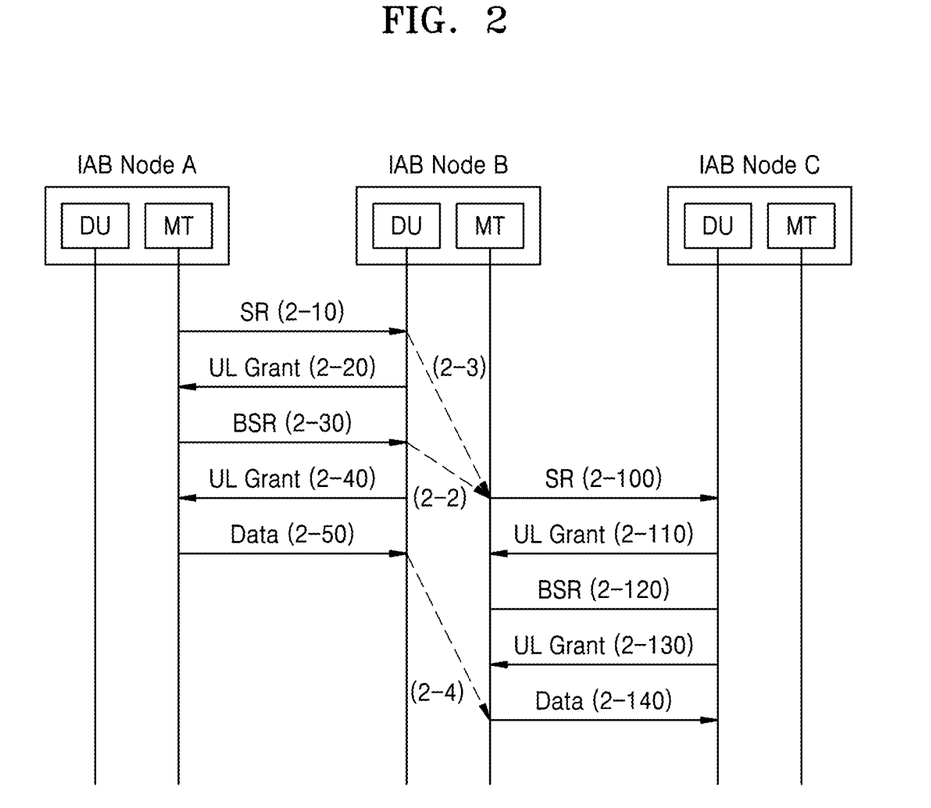
FIG. 2 illustrates a message exchange procedure involving three nodes in a multi-hop IAB network arrangement according to at least one embodiment of the present disclosure.

FIG. 2 illustrates at least one embodiment of the present disclosure by means of a message exchange involving Nodes A, B and C.

In one embodiment, Node A (first node) sends an SR message (2-10) and Node B (second node) responds with a UL Grant message (2-20). Node A then sends a BSR message (2-30). Upon receipt of the BSR message (2-30), Node B is aware of the quality and quantity of data which is destined for onward transmission to Node C (third node) and so transmits an SR message (2-100) to Node C. Node C responds with a UL grant message (2-110). Meanwhile, Node A, in response to a UL grant message (2-40) from Node B, transmits its data (2-50) to Node B.

Once Node B receives the UL grant message (2-110) from Node C, it transmits a new BSR message (2-120) to Node C, based on the information it has received from Node A in its BSR message (2-30). Node C responds with a UL Grant (2-130) and Node B transmits the data (2-140) to Node C. Note that in certain circumstances, Node C may not comply with the request from Node B if, for instance, it supplies resources of its own accord or if it is otherwise unable to comply due to capacity or other operational reasons. However, in the case where Node B requests resources, Node C will consider the request and decide whether to provide the requested resources.

In this case, the dashed arrow 2-2 represents the link between Node B learning from Node A the details of the data to be forwarded to Node C and Node B consequently taking action.

The dotted arrow 2-4 indicates the data flowing from Node B to Node C. Note that this is earlier than as shown in FIG. 1 where the data from Node A is received at Node B before any request is even made to forward it to Node C. In this embodiment, Node B is able to pre-empt the need to request capacity and so certain activities are conducted in parallel, as shown.

By use of the embodiments set out above, latency can be reduced and overall increase in system performance is experienced. However, it is possible to further improve performance by means of other trigger mechanisms to pre-empt the need to request capacity.

However, it may not be desirable to for Node B to request UL resources from Node C in every situation when it is aware of data arriving from Node A. To do so could be wasteful in terms of the finite resources which are available. As such, in embodiments of the disclosure, the request of resources from node C by means of SR (2-100) or new BSR (2-120) is not automatic and is triggered if one or more of the following conditions is met:

BSR (2-30) from node A indicates the presence of data in child node (node A) of a specific type/pertaining to a specific service;

BSR (2-30) from node A indicates the presence of data of high priority;

BSR (2-30) from node A indicates the presence of data of a certain priority relative to priority of existing data in the node's own buffers; or BSR (2-30) from node A indicates that the total buffer occupancy at the child node is above a certain threshold (which can be configurable);

BSR (2-30) from node A indicates that the amount of data of a specific type/pertaining to a specific service/of high priority is above a certain threshold;

BSR (2-30) from node A indicates the presence of data which will require a certain number of hops above a certain (configurable) threshold to reach its destination;

BSR (2-30) from node A indicates the presence of data, the transmission of which will require a type of resource that is not already configured (e.g. a different type of carrier/bandwidth part/numerology).

In a further embodiment, the new BSR (2-120) from node B to node C is triggered only if node B determines that the time-to-grant for its child node and/or the time until resources referenced in the grant are available is above a certain threshold.

In a still further embodiment, the new BSR (2-120) from node B to node C is not triggered if node B determines that it cannot give resources to its child node within a reasonable (configurable) time window.

The embodiments described so far relate to new BSR triggers based on reception of BSR (2-30) from the child node (node A). Embodiments of the disclosure also relate to new BSR triggers based on reception of SR (2-10) from the child node. In this way, an even earlier request can be made. This is represented by dashed arrow 2-3 in FIG. 2. Many of the examples cited above apply equally here.

However, as mentioned previously, it may not be desirable for Node B to request UL resources from Node C in every situation when it is aware of data arriving from Node A. To do so could be wasteful in terms of the finite resources which are available. As such, in another embodiment, SR (2-100) or the new BSR (2-120) is only triggered if, as well as reception of SR (2-10) from the child node (node A), one or more of the following conditions is met:

SR configuration (used for transmission of the SR) is configured for a logical channel of high priority;

SR configuration is configured for a logical channel of a certain priority relative to priority of existing data in the node's own buffers; or SR configuration is configured for logical channel dedicated to a specific service/with data of high priority is above a certain threshold;

SR configuration is configured for logical channel with data which will require a certain number of hops above a certain (configurable) threshold to reach its destination;

SR configuration is configured for a logical channel with data which will require a type of resource that is not already configured (e.g. a different type of carrier/bandwidth part/numerology).

In this context, SR configuration refers to a collection of resources where a node/terminal is allowed to send the SR, more specifically a set of PUCCH resources. In NR there are multiple such sets (called configurations), and which one is used indicates certain properties of the channel that triggered the SR.

In an embodiment, the new BSR (2-120) is generated and transmitted when UL resources are allocated to node B and the number of padding bits is equal to or larger than the size of the BSR (2-120) according to its subheader. When examining the padding size, the existing BSR (2-30) can be prioritized over the new BSR (2-120). Alternatively, the new BSR (2-120) can be prioritized over the existing BSR (2-30). This decision may be made based on how recently the existing BSR (2-30) has been sent. It will also depend on whether the new BSR (2-120) comprises the existing BSR, for which, see below.

Embodiments of the disclosure additionally relate to the format of the new BSR (2-120), and its content.

For any of the above embodiments, the BSR in question (2-120) can only report the total amount of data in the buffers of its child node (node A). In a further embodiment, the BSR (2-120) reports the full (or partial) buffer status of the child node (node A) buffers but converted to the status of its own (node B) buffers, meaning that, in other words, node B will calculate the expected change in the occupancy of its own Logical Channel Groups (LCGs) or a subset thereof, if e.g. a padding BSR is sent if the data was to be received as reported in a BSR by node A.

In a further embodiment, this calculation takes into account any existing grants already given to node B by node C and deducts any reductions in buffer status occupancy expected based on available UL resource. Further, the new BSR (2-120) uses a different format (indicated e.g. by a flag/reserved bit/LCID) making it clear that this is the "expected data BSR". In cases where this new BSR indicates cumulative occupancy (current+expected data), this may be sent as two separate BSRs.

In an embodiment, according to the foregoing detail, three different types of buffer status are defined:
 1. Current data only (existing BSR)
 2. Current data+expected data (new BSR Type A)
 3. Expected data only (new BSR Type B)

Embodiments of the disclosure operate with a mix of option 1 and at least one of options 2 and 3.

In another embodiment, the new BSR (2-120) includes additional data on top of buffer occupancy data, including one or more of:

Time when the child node BSR (2-30) was received;

Time when the reception of data (2-50) from child node is expected;

Time when the child node SR (2-10) was received;

Time when node B expects to give UL grant (2-40) to node A.

In another embodiment, node C can configure reporting of the new BSR (2-120) with certain periodicity, and/or on occasions when node B is polled. Node C can also prohibit reporting of the new BSR (2-120) over a certain period of time.

The embodiments described so far have focused on node B having only one parent node (node C). Embodiments also relate to situations where node B has multiple parent nodes. This includes, but is not limited to, the case of dual connectivity. In this case, embodiments of the disclosure also relate to:

New BSR (2-120) is only sent to one of the parent nodes node (e.g. Master node, or node where bulk of grants are expected to come from based on past history, or node where bulk of grants are expected to come from based on known destination addresses of past packets from this child node, or node where bulk of grants are expected to come from based on known IDs of configured DRBs from this child node, or node which node B would prefer to get a grant from);

New BSR (2-120) is sent to a subset or all of the parent nodes in identical copies;

New BSR (2-120) is sent to a subset or all of the parent nodes but the reported expected data occupancy is split across the multiple reports according to some configurable threshold.

As can be seen from the foregoing, embodiments of the present disclosure permit the earlier provision of resources in a network comprising a plurality of IAB nodes, such that latency is decreased. Furthermore, by use of secondary triggers, as defined in the foregoing, it is possible to optimize the use of finite resources by not allocating capacity in the network unless certain criteria are satisfied.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Figure 3:
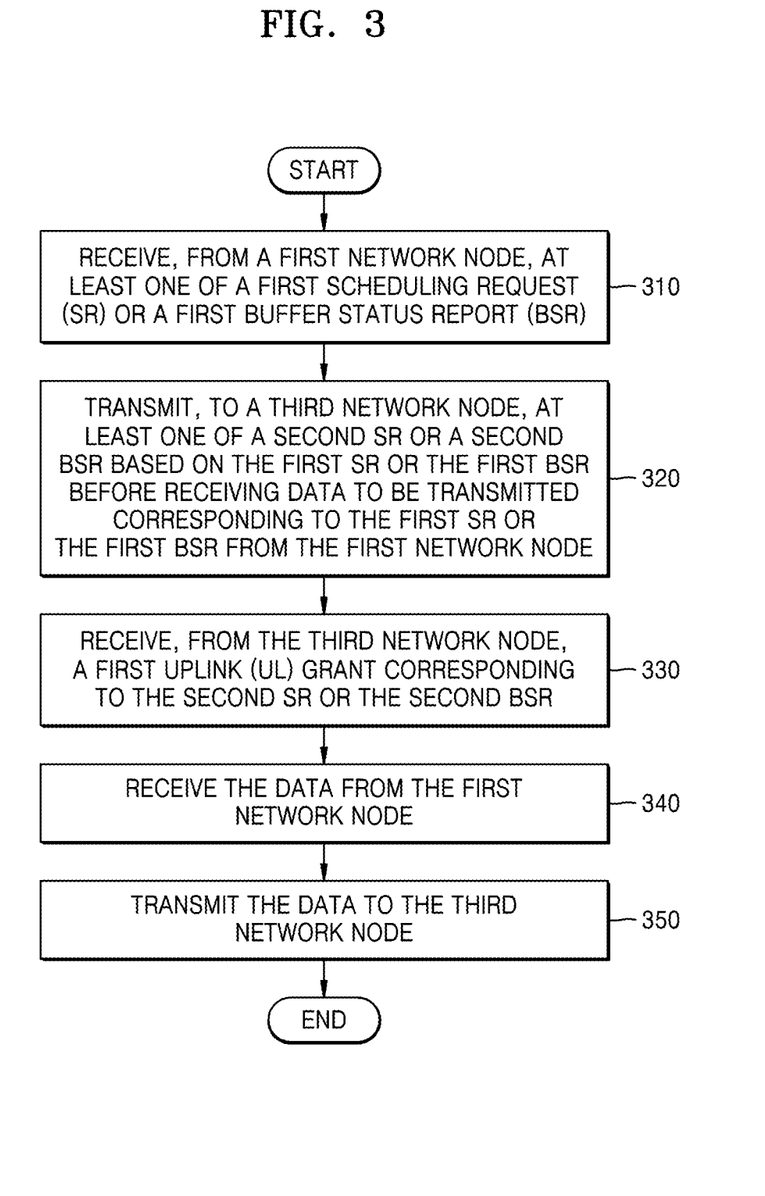
FIG. 3 illustrates a method performed by a second network node according to an embodiment of the present disclosure.

FIG. 3 illustrates a method performed by a second network node according to an embodiment of the present disclosure.

Referring to FIG. 3, in operation 310, the second network node may receive, from a first network node, at least one of a first scheduling request (SR) or a first buffer status report (BSR).

In operation 320, the second network node may transmit, to a third network node, at least one of a second SR or a second BSR based on the first SR or the first BSR before receiving data to be transmitted corresponding to the first SR or the first BSR from the first network node.

In operation 330, the second network node may receive, from the third network node, a first uplink (UL) grant corresponding to the second SR or the second BSR.

In operation 340, the second network node may receive the data from the first network node; and In operation 350, the second network node may transmit the data to the third network node.

According to the method described in FIG. 3, latency delays that might, by requesting resources for data from the third network node before the second network node receives the data from the first network node, the latency delay can be reduced.

Figure 4:
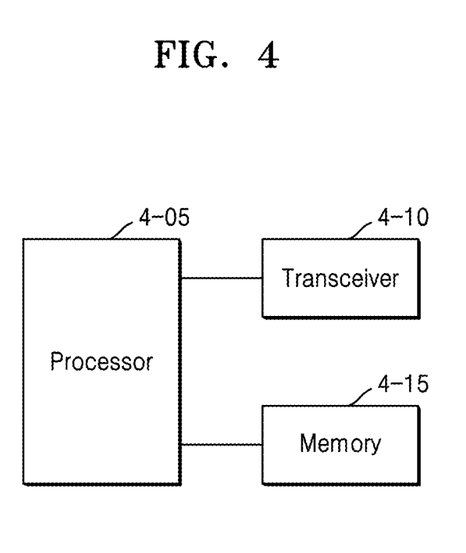
FIG. 4 is a block diagram illustrating a UE according to various embodiments of the present disclosure.

FIG. 4 is a block diagram illustrating a UE according to an embodiment of the present disclosure.

FIG. 4 schematically illustrates a User Equipment (UE) according to an embodiment of the present disclosure.

The UEs described above may correspond to the UE of FIG. 4.

Referring to the FIG. 4, the UE may include a processor 4-05, a transceiver 4-10 and a memory 4-15. However, all of the illustrated components are not essential. The UE may be implemented by more or less components than those illustrated in FIG. 4. In addition, the processor 4-05 and the transceiver 4-10 and the memory 4-15 may be implemented as a single chip according to another embodiment.

The aforementioned components will now be described in detail.

The processor 4-05 may include one or more processors or other processing devices that control the proposed function, process, and/or method. Operation of the UE may be implemented by the processor 4-05.

The processor 4-05 may detect a PDCCH on a configured control resource set. The processor 4-05 determines a method for dividing CBs and a method for rate matching of a PDSCH according to the PDCCH. The processor 4-05 may control the transceiver 4-10 to receive the PDSCH according to the PDCCH. The processor 4-05 may generate HARQ-ACK information according to the PDSCH. The processor 4-05 may control the transceiver 4-10 to transmit the HARQ-ACK information.

The transceiver 4-10 may include a RF transmitter for up-converting and amplifying a transmitted signal, and a RF receiver for down-converting a frequency of a received signal. However, according to another embodiment, the transceiver 4-10 may be implemented by more or less components than those illustrated in components.

The transceiver 4-10 may be connected to the processor 4-05 and transmit and/or receive a signal. The signal may include control information and data. In addition, the transceiver 4-10 may receive the signal through a wireless channel and output the signal to the processor 4-05. The transceiver 4-10 may transmit a signal output from the processor 4-05 through the wireless channel.

The memory 4-15 may store the control information or the data included in a signal obtained by the UE. The memory 4-15 may be connected to the processor 4-05 and store at least one instruction or a protocol or a parameter for the proposed function, process, and/or method. The memory 4-15 may include read-only memory (ROM) and/or random access memory (RAM) and/or hard disk and/or CD-ROM and/or DVD and/or other storage devices.

Figure 5:
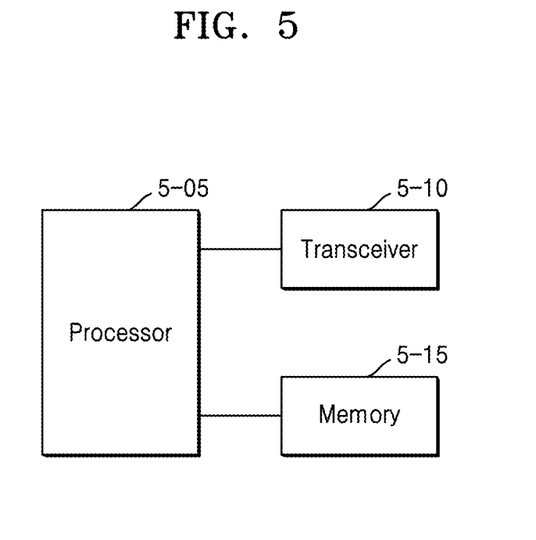
FIG. 5 is a block diagram illustrating a network node according to various embodiments of the present disclosure.

FIG. 5 is a block diagram illustrating a network node according to an embodiment of the present disclosure.

The network entities, for example, node, network node, base stations, eNBs, gNBs, network functions, and any other network entity described above may correspond to the network node of FIG. 5.

Referring to FIG. 5, the network node may include a processor 5-05, a transceiver 5-10 and a memory 5-15. However, all of the illustrated components are not essential. The network node may be implemented by more or less components than those illustrated in FIG. 5. In addition, the processor 5-05 and the transceiver 5-10 and the memory 5-15 may be implemented as a single chip according to another embodiment.

The aforementioned components will now be described in detail.

The processor 5-05 may include one or more processors or other processing devices that control the proposed function, process, and/or method. Operation of the network node may be implemented by the processor 5-05.

The transceiver 5-10 may include a RF transmitter for up-converting and amplifying a transmitted signal, and a RF receiver for down-converting a frequency of a received signal. However, according to another embodiment, the transceiver 5-10 may be implemented by more or less components than those illustrated in components.

The transceiver 5-10 may be connected to the processor 5-05 and transmit and/or receive a signal. The signal may include control information and data. In addition, the transceiver 5-10 may receive the signal through a wireless channel and output the signal to the processor 5-05. The transceiver 5-10 may transmit a signal output from the processor 5-05 through the wireless channel.

The memory 5-15 may store the control information or the data included in a signal obtained by the network node. The memory 5-15 may be connected to the processor 5-05 and store at least one instruction or a protocol or a parameter for the proposed function, process, and/or method. The memory 5-15 may include read-only memory (ROM) and/or random access memory (RAM) and/or hard disk and/or CD-ROM and/or DVD and/or other storage devices.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

Although the present disclosure has been described with various embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke "means for function claim" (e.g. 35 U.S.C. § 112(f)) unless the exact words "means for" are followed by a participle.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network node in a wireless communication system, the method comprising:
   detecting at least one triggering event of a pre-emptive buffer status report (BSR); and
   transmitting the pre-emptive BSR to a parent network node of the network node in case that the at least one triggering event is detected,
   wherein a format of the pre-emptive BSR is indicated by a logical channel identifier (LCID) value,
   wherein the pre-emptive BSR comprises information indicating an amount of data expected to arrive at the network node from a user equipment (UE) or a child network node of the network node,
   wherein the LCID value indicating the format of the pre-emptive BSR is different from an LCID value indicating a format of a BSR that is different from the pre-emptive BSR, and
   wherein the information indicating the amount of the data expected to arrive comprises expected data volume calculated across at least one logical channel of at least one logical channel group (LCG).

2. The method of claim 1, wherein the at least one triggering event comprises an event that an uplink grant is provided to the UE or the child network node.

3. The method of claim 1, wherein the at least one triggering event comprises an event that a BSR is received from the UE or the child network node.

4. The method of claim 1, wherein the format of the pre-emptive BSR is different from the format of the BSR that is different from the pre-emptive BSR.

5. The method of claim 1, further comprising receiving a scheduling request (SR) from the UE or the child network node,
wherein the transmitting of the pre-emptive BSR to the parent network node comprises transmitting the pre-emptive BSR based on configuration of the SR.

6. The method of claim 1, wherein the transmitting of the pre-emptive BSR to the parent network node comprises transmitting the pre-emptive BSR based on a priority of the data expected to arrive.

7. The method of claim 6, wherein the transmitting of the pre-emptive BSR based on the priority of the data expected to arrive comprises transmitting the pre-emptive BSR in case that the priority of the data expected to arrive is higher than a priority of data present in a buffer of the network node.

8. The method of claim 1, wherein the transmitting of the pre-emptive BSR to the parent network node comprises transmitting the pre-emptive BSR based on number of hops required for the data to reach destination of the data.

9. A network node in a wireless communication system, the network node comprising:
a transceiver; and
at least one processor configured to:
detect at least one triggering event of a pre-emptive buffer status report (BSR), and control the transceiver to transmit the pre-emptive BSR to a parent network node of the network node in the case that the at least one triggering event is detected,
wherein a format of the pre-emptive BSR is indicated by a logical channel identifier (LCID) value,
wherein the pre-emptive BSR comprises information indicating an amount of data expected to arrive at the network node from a user equipment (UE) or a child network node of the network node,
wherein the LCID value indicating the format of the pre-emptive BSR is different from an LCID value indicating a format of a BSR that is different from the pre-emptive BSR, and
wherein the information indicating the amount of the data expected to arrive comprises expected data volume calculated across at least one logical channel of at least one logical channel group (LCG).

10. The network node of claim 9, wherein the at least one triggering event comprises an event that an uplink grant is provided to the UE or the child network node.

11. The network node of claim 9, wherein the at least one triggering event comprises an event that a BSR is received from the UE or the child network node.

12. The network node of claim 9, wherein the format of the pre-emptive BSR is different from the format of the BSR that is different from the pre-emptive BSR.

13. The network node of claim 9, wherein the at least one processor is further configured to:
control the transceiver to receive a scheduling request (SR) from the UE or the child network node, and
control the transceiver to transmit the pre-emptive BSR to the parent network node based on configuration of the SR.

14. The network node of claim 9, wherein the at least one processor is further configured to control the transceiver to transmit the pre-emptive BSR to the parent network node based on a priority of the data expected to arrive.

15. The network node of claim 14, wherein the at least one processor is further configured to control the transceiver to transmit the pre-emptive BSR to the parent network node in case that the priority of the data expected to arrive is higher than a priority of data present in a buffer of the network node.

16. The network node of claim 9, wherein the at least one processor is further configured to control the transceiver to transmit the pre-emptive BSR to the parent network node based on number of hops required for the data to reach destination of the data.

* * * * *

UNITED STATES PATENT AND TRADEMARK OFFICE
CERTIFICATE OF CORRECTION

PATENT NO. : 11,564,124 B2
APPLICATION NO. : 16/791987
DATED : January 24, 2023
INVENTOR(S) : Milos Tesanovic et al.

It is certified that error appears in the above-identified patent and that said Letters Patent is hereby corrected as shown below:

On the Title Page

Column 1, Item (30), Line 2, "(GB) 1902041" should read -- (GB) 1902041.1 --.

Signed and Sealed this
Eleventh Day of April, 2023

Katherine Kelly Vidal
*Director of the United States Patent and Trademark Office*